United States Patent
Kobayashi et al.

(10) Patent No.: US 8,317,889 B2
(45) Date of Patent: Nov. 27, 2012

(54) INSTALLATION STRUCTURE FOR DUSTPROOF NET

(75) Inventors: Tamio Kobayashi, Tsuchiura (JP); Hiroyuki Isobe, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 161 days.

(21) Appl. No.: 12/845,193

(22) Filed: Jul. 28, 2010

(65) Prior Publication Data
US 2011/0023426 A1 Feb. 3, 2011

(30) Foreign Application Priority Data

Jul. 29, 2009 (JP) ................................. 2009-176499

(51) Int. Cl.
*B01D 46/00* (2006.01)

(52) U.S. Cl. .......... 55/385.3; 55/467; 55/467.1; 55/471; 55/490; 165/119; 165/122; 180/68.1; 180/84

(58) Field of Classification Search ............. 55/385.3, 55/385.1, 295, 297, 467, 400, 487, 505, 507; 123/198 E, 41.49; 180/68.1, 84; 95/269; 96/134, 396; 165/119, 122; 60/303, 311
See application file for complete search history.

(56) References Cited

U.S. PATENT DOCUMENTS

| | | | |
|---|---|---|---|
| 5,944,603 A * | 8/1999 | Guinn et al. | 460/100 |
| 6,068,675 A * | 5/2000 | Tsuda et al. | 55/385.3 |
| 6,185,934 B1 * | 2/2001 | Teboul | 60/297 |
| 6,319,304 B1 * | 11/2001 | Moredock | 95/269 |
| 6,425,943 B1 * | 7/2002 | Moredock | 95/269 |
| 6,432,152 B2 * | 8/2002 | Frerich | 55/295 |
| 7,431,073 B2 * | 10/2008 | Radke et al. | 165/119 |
| 7,686,857 B2 * | 3/2010 | Gonze et al. | 55/282.3 |
| 2004/0055469 A1 * | 3/2004 | Kroculick | 96/134 |
| 2007/0227107 A1 * | 10/2007 | Ito et al. | 55/385.3 |
| 2011/0056383 A1 * | 3/2011 | Make et al. | 96/396 |

FOREIGN PATENT DOCUMENTS

JP 2006-52689 A 2/2006

* cited by examiner

*Primary Examiner* — Duane Smith
*Assistant Examiner* — Minh-Chau Pham
(74) *Attorney, Agent, or Firm* — Crowell & Moring LLP (57) ABSTRACT

Disclosed is an installation structure for a dustproof net to be arranged in a machine, which has an engine, a cooling fan for producing cooling air to cool the engine, plural heat exchangers arranged on an upstream side of the cooling fan, and a compartment with the engine, cooling fan and plural heat exchangers accommodated therein, such that the dustproof net is arranged at a position on a side upstream of the heat exchanger located most upstream among the plural heat exchanger relative to a flow of air drawn in by the cooling fan and in isolation from the most upstream heat exchanger to remove dust contained in the air drawn in by the cooling fan. The dustproof net is provided with a support structure for supporting the dustproof net on members that form the compartment.

2 Claims, 5 Drawing Sheets

INSTALLATION STRUCTURE FOR DUSTPROOF NET

CROSS-REFERENCE TO RELATED APPLICATION

This application claims the priority of Japanese Patent Application 2009-176499 filed Jul. 29, 2009, which is incorporated herein by reference.

BACKGROUND OF THE INVENTION

1. Field of the Invention

This invention relates to an installation structure for a dustproof net to be arranged in a machine having an engine, a cooling fan and plural heat exchangers, like a construction machine such as a hydraulic excavator.

2. Description of the Related Art

As a conventional technology of this sort, there is one disclosed in JP-A-2006-52689. This conventional technology is concerned with one to be arranged in a construction machine such as a hydraulic excavator. This construction machine has a revolving upperstructure, and an engine room, in other words, an engine compartment mounted on the revolving upperstructure. Arranged in the engine compartment are an engine, a cooling fan for producing cooling air to cool the engine, and plural heat exchangers arranged on an upstream side of the cooling fan. These heat exchangers include, for example, an oil cooler for cooling hydraulic oil, a radiator for cooling the engine, an intercooler for a turbocharger, and a condenser for an air conditioner. The condenser is arranged most upstream relative to a flow of cooling air, and downstream of the condenser, the oil cooler, radiator and intercooler are arranged one after the other. The oil cooler, radiator and intercooler are held on a mounting frame via an auxiliary sealing material. The condenser which is located most upstream is arranged integrally with the mounting frame, and is held on a sealed frame smaller in shape and dimensions than the mounting frame.

In the construction machine disclosed in this JP-A-2006-52689, a protective net, specifically a dustproof net, which serves to remove dust contained in air drawn in by the cooling fan, is fixedly secured on the sealed frame with the condenser held thereon. Namely, the protective net is arranged at a position upstream of the condenser located most upstream among the plural heat exchangers and in isolation from the condenser. Upon performing a maintenance of the protective net, the protective net is detached and attached by opening a maintenance cover, in other words, a door cover of the engine room, said door cover being arranged at a position opposite the protective net.

SUMMARY OF THE INVENTION

Problem to be Solved by the Invention

The above-mentioned conventional technology is accompanied by problems to be described hereinafter, because the protective net is arranged as an integral structure with the oil cooler, radiator, intercooler and condenser via the mounting frame and sealed frame.

As a first problem, the installation position of the protective net, specifically the dustproof net is determined by the mounting positions of the heat exchangers, thereby involving a potential concern in that depending on the mounting positions of the heat exchangers, the dustproof net may be arranged at a position where the detachment and attachment work of the dustproof net to be performed by opening the maintenance cover may be rendered difficult.

As a second problem, the shape and dimensions of the dustproof net are determined by the shape and dimensions of the sealed frame with the condenser held thereon, and therefore, restrictions may be imposed by the sealed frame when it is desired to enlarge the shape and dimensions of the dustproof net.

As a third problem, when it is desired to mount, for example, heat exchangers of different shapes and dimensions in plural construction machines equipped with an engine room of the same size, there is a potential need for the arrangement of dustproof nets of shapes and dimensions corresponding to the respective heat exchangers because the heat exchanges are different in shape and dimensions. In other words, it may become necessary to manufacture plural types of dustproof nets for the corresponding plural construction machines, respectively, so that the manufacture of the dustproof nets may potentially become complex.

With the foregoing circumstances in view, the present invention has as an object thereof the provision of an installation structure for a dustproof net, which can install the dustproof net without being affected by the mounting positions of heat exchangers and can also set the shape and dimensions of the dustproof net irrelevant to the heat exchangers.

To achieve this object, an installation structure according to the present invention for a dustproof net is characterized in that in the installation structure for the dustproof net to be arranged in a machine having an engine, a cooling fan for producing cooling air to cool the engine, plural heat exchangers arranged on an upstream side of the cooling fan, and a compartment with the engine, cooling fan and plural heat exchangers accommodated therein such that the dustproof net is arranged at a position on a side upstream of the heat exchanger located most upstream among the plural heat exchanger relative to a flow of air drawn in by the cooling fan and in isolation from the most upstream heat exchanger to remove dust contained in the air drawn in by the cooling fan, the dustproof net is provided with a support structure for supporting the dustproof net on members that form the compartment.

According to the present invention constructed as described above, the dust contained in the air drawn in by the cooling fan is removed by the dustproof net upon passage of the air through the dustproof net. The clean air from which the dust has been removed as described above is fed to the heat exchangers, and further, is applied as cooling air to the engine. As a consequence, the engine is cooled. The dustproof net which serves to remove dust from air as described above is supported via the support structure on the members that form the compartment in which the engine, cooling fan and plural heat exchangers are accommodated. Therefore, the dustproof net can be installed independently of the heat exchangers, in other words, can be installed without being affected by the mounting positions of the heat exchangers, and further, the shape and dimensions of the dustproof net can be set irrelevant to the heat exchangers.

The installation structure according to the present invention for the dustproof net may also be characterized in that in the above-described invention, the machine is a construction machine provided with a revolving upperstructure, and the compartment is an engine compartment mounted on the revolving upperstructure. The present invention constructed as described above is suited for an installation structure for a dustproof net to be arranged in an engine compartment of a hydraulic excavator.

The installation structure according to the present invention for the dustproof net may also be characterized in that in the above-described invention, the support structure comprises holding strips, which hold the dustproof net thereon and are to be fixedly secured on the members that form the engine compartment. The present invention constructed as described above can stably hold the dustproof net by the holding strips, and by the holding strips, can also block the cooling air produced by the cooling fan, thereby making it possible to surely guide the cooling air to the dustproof net such that the cooling air is allowed to pass through the dustproof net.

The installation structure according to the present invention for the dustproof net may also be characterized in that in the above-described invention,
the holding strips comprise a first side-holding strip to be fixedly secured on a front-side compartment cover located, as a member forming the engine compartment, on a front side of the revolving upperstructure to hold one of opposite sides of the dustproof net, a second side-holding strip to be fixedly secured on a rear-side compartment cover located, as another member forming the engine compartment, on a rear side of the revolving upperstructure to hold the other side of the dustproof net, a bottom-holding strip to be fixedly secured on a revolving frame of the revolving upperstructure, said revolving frame being a further member forming the engine compartment, to hold a bottom of the dustproof net, and a top-holding strip arranged on a top part of the dustproof net and fixedly secured at one end thereof on the first side-holding strip and at an opposite end thereof on the second side-holding strip. The present invention constructed as described above can hold the dustproof net by the first side-holding strip, second side-holding strip, bottom-holding strip and top-holding strip, and further, can shield the left, right, bottom and top parts of the dustproof net by the first side-holding strip, second side-holding strip, bottom-holding strip and top-holding strip and can hence surely guide the cooling air to the dustproof net.

The installation structure according to the present invention for the dustproof net may also be characterized in that in the above-described invention, the dustproof net is arranged such that the dustproof net is commonly used for all the plural heat exchangers, and
the engine compartment comprises a battery installation region arranged on a draw-in side relative to the flow of air drawn in by the cooling fan and accommodating batteries arranged therein and a heat-exchanger mounting region arranged on a downstream side of the battery installation region and accommodating the plural heat exchangers arranged therein, and the dustproof net is arranged at a boundary between the battery installation region and the heat-exchanger mounting region. The present invention constructed as described above can reduce the number of dustproof nets, because the dustproof net is arranged such that it is commonly used for all the heat exchangers. In addition, the battery installation region located upstream of the dustproof net can be used as a space for straightening air that is to pass through the dustproof net, thereby making it possible to allow the drawn-in air to pass evenly through the entire area of the dustproof net.

As the present invention is provided with the support structure for supporting the dustproof net on the members that form the compartment in which the engine, cooling fan and plural heat exchangers are accommodated, the dustproof net can be installed independently of the heat exchangers. In other words, the dustproof net can be installed without being affected by the mounting positions of the heat exchangers. As a consequence, the dustproof net can be installed at a position where its attachment and detachment work is facilitated, thereby making it possible to improve the efficiency of a maintenance of the dustproof net although there has been a conventional concern about the efficiency.

According to the present invention, the shape and dimensions of the dustproof net can be set irrelevant to the heat exchangers. It is, therefore, possible to make the dustproof net greater in shape and dimensions than the conventional ones as needed. Such an enlarged dustproof net can be provided with a longer service life than the conventional ones. As the shape and dimensions of the dustproof net can be set irrelevant to the heat exchangers, dustproof nets of the same shape and dimensions can be arranged in respective machines which are the same in the shape and dimensions of a room but are different from each other in the shapes and dimensions of heat exchangers to be accommodated in the room, and the dustproof net is assured to have excellent versatility. Therefore, the manufacture of dustproof nets in such a case can be made easier than before, and their manufacturing cost can be lowered.

BEST MODE FOR CARRYING OUT THE INVENTION

The embodiment of the installation structure according to the present invention will hereinafter be described with reference to the accompanying drawings.

The installation structure according to this embodiment is arranged in a machine, for example, a hydraulic excavator as a construction machine. This hydraulic excavator is provided with an unillustrated travel base, a revolving upperstructure 1 depicted in FIGS. 3, 6, etc. and mounted on the travel base, and an unillustrated, front working mechanism attached pivotally in the up-and-down direction on the revolving upperstructure 1 to perform digging work or the like of earth or sand. Arranged on the revolving upperstructure 1 are an unillustrated operator's cab and counterweight for assuring a weight balance, and also, a room disposed between these operator's cab and counterweight and accommodating therein an engine 4 and others to be described subsequently herein, specifically an engine compartment 2 shown in FIGS. 1, 2, etc.

Figure 1:
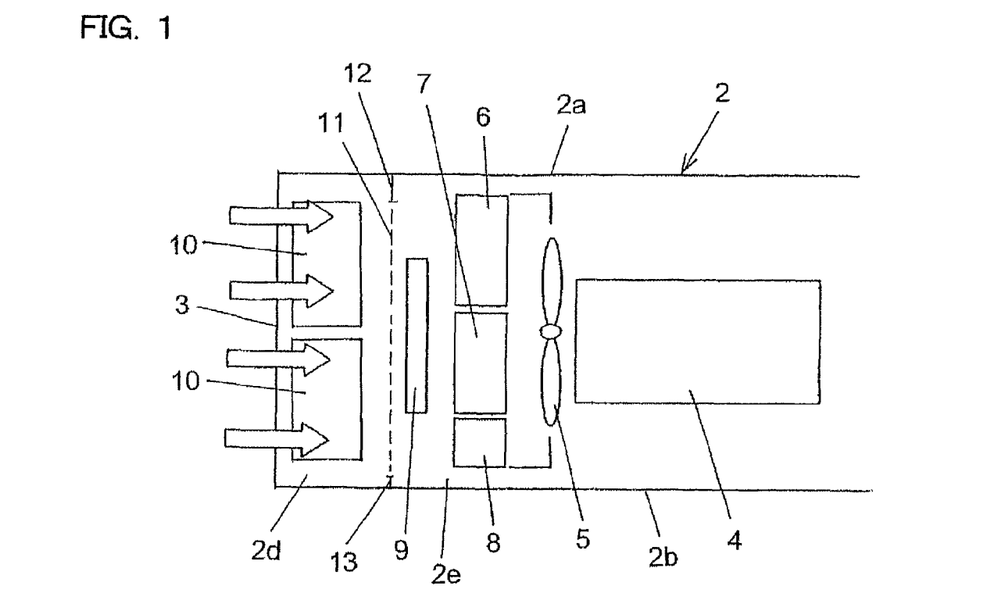
FIG. 1 is a plan view schematically illustrating an embodiment of the installation structure according to the present invention for the dustproof net.
Figure 2:
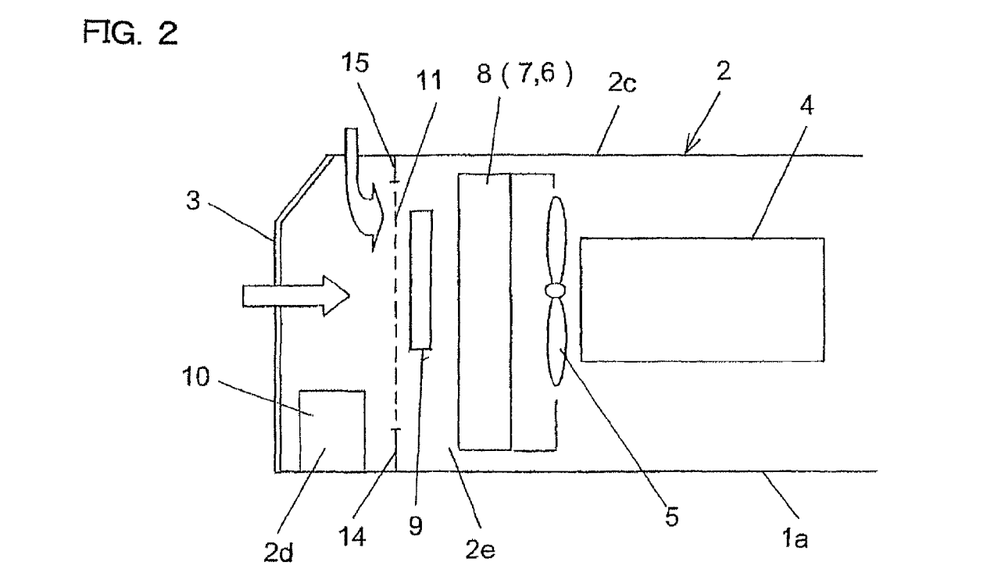
FIG. 2 is a side view schematically showing the embodiment of the installation structure according to the present invention for the dustproof net.
Figure 5:
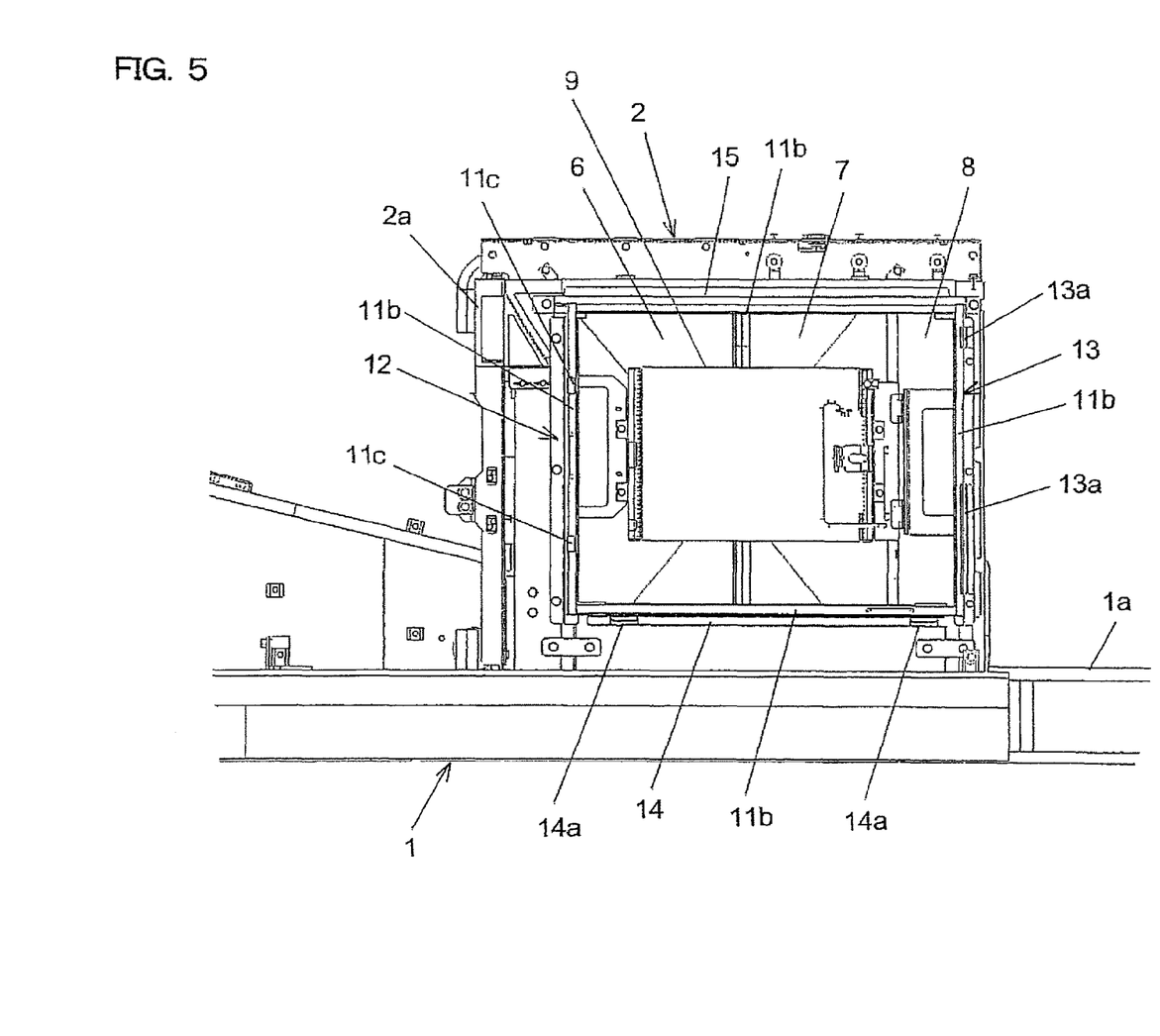
FIG. 5 is a front view showing the embodiment of the installation structure according to the present invention for the dustproof net, with a net section having been removed from the dustproof net.
Figure 6:
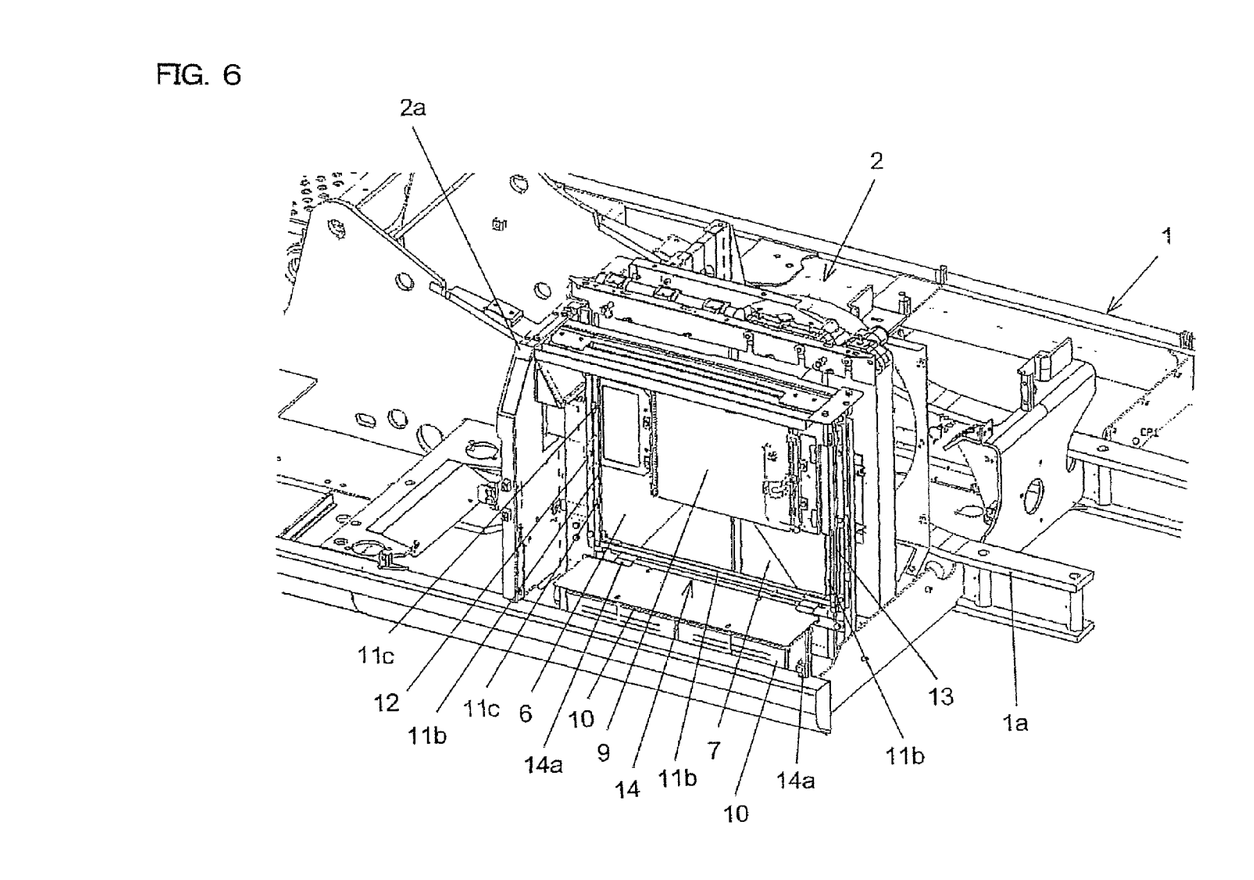
FIG. 6 is a perspective view depicting the embodiment of the installation structure according to the present invention for the dustproof net, with the net section having been removed from the dustproof net.

Accommodated in the engine compartment 2 are, as illustrated in FIGS. 1 and 2, the engine 4, a cooling fan 5 for producing cooling air to cool the engine 4, and as also shown in FIGS. 5 and 6, plural heat exchangers arranged on an upstream side of the cooling fan 5, for example, an oil cooler 6 for cooling hydraulic oil, a radiator 7 for cooling the engine, an intercooler 8 for a turbocharger, and a condenser 9 for an air conditioner. Among these heat exchangers, the condenser 9 is arranged most upstream relative to a flow of cooling air, and downstream of this condenser 9, the oil cooler 6, radiator 7 and intercooler 8 are arranged mutually one after the other. On an upstream side of the condenser 9, batteries 10 are arranged.

Figure 3:
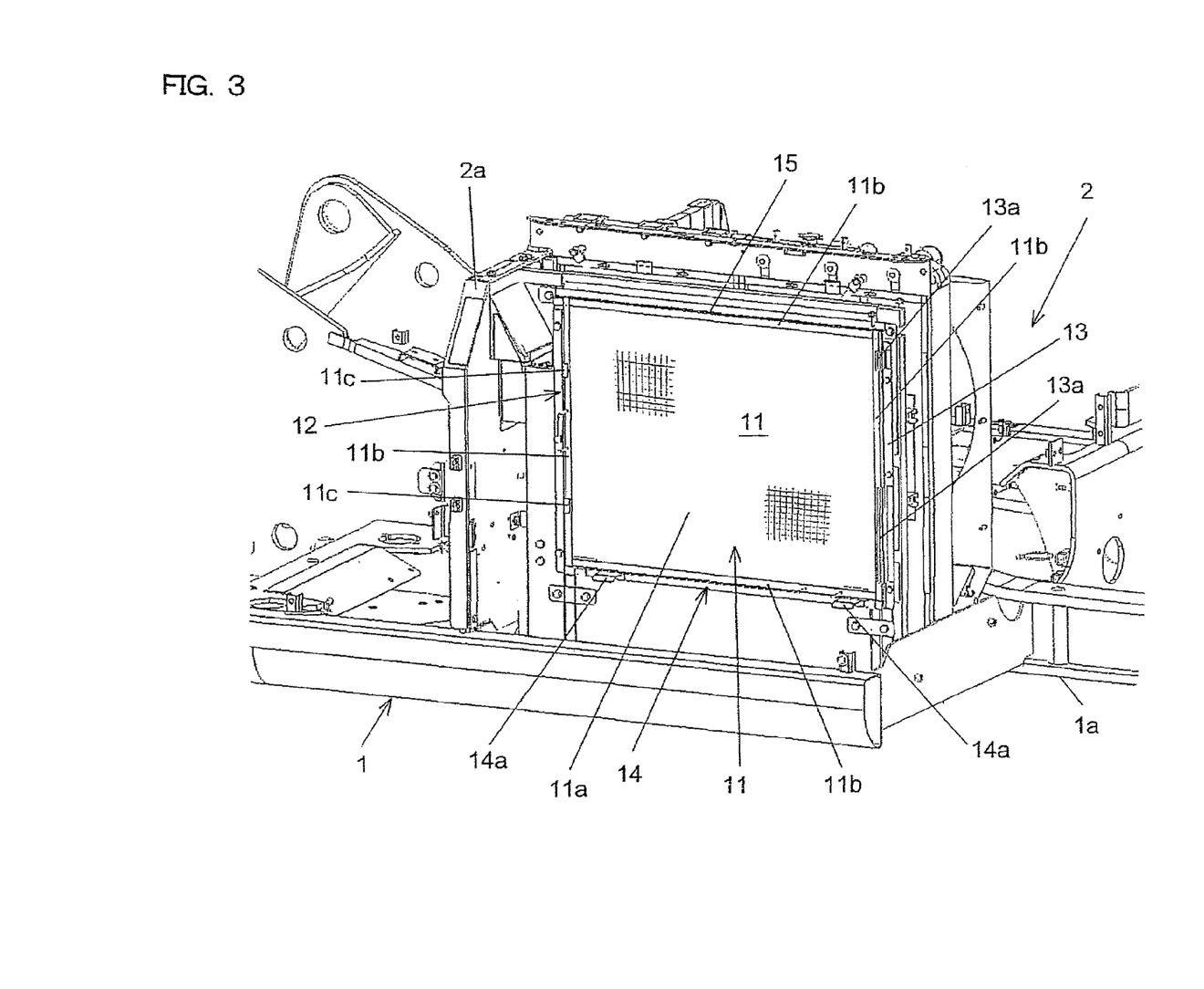
FIG. 3 is a perspective view depicting the embodiment of the installation structure according to the present invention for the dustproof net.
Figure 4:
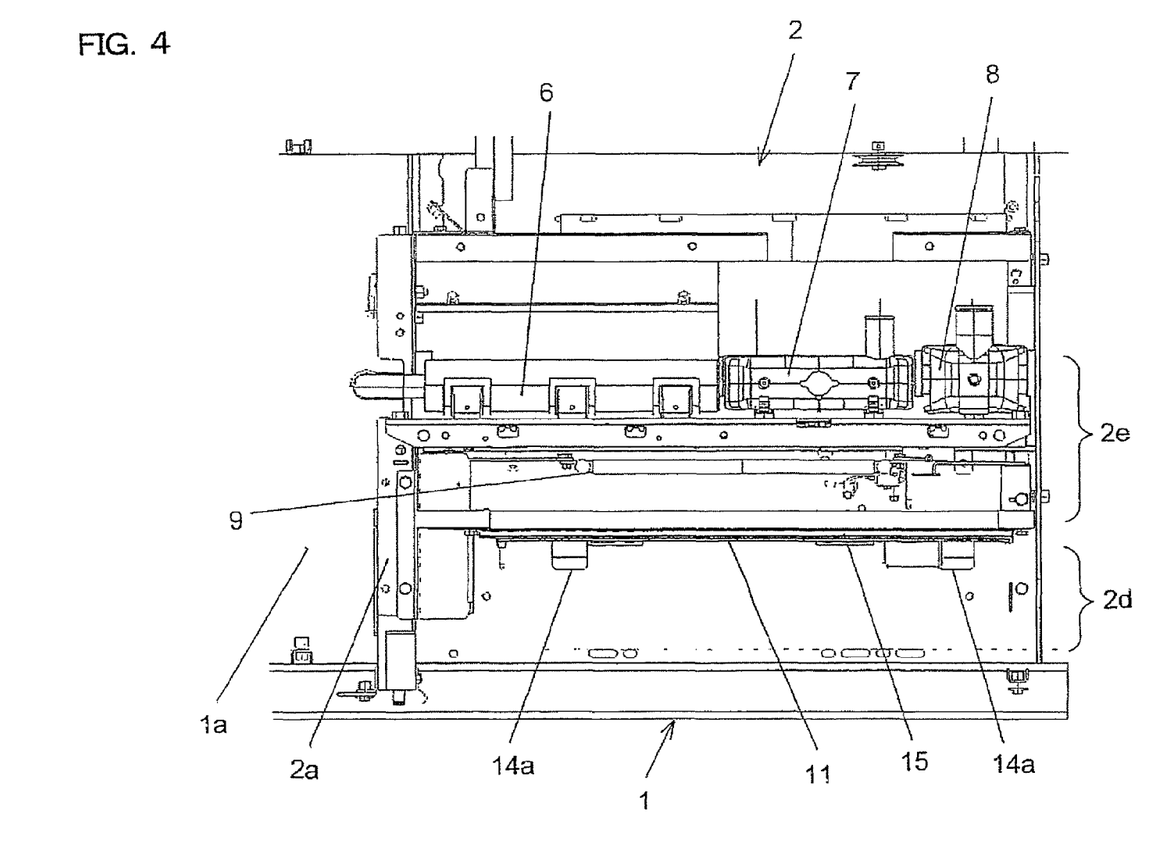
FIG. 4 is a plan view illustrating the embodiment of the installation structure according to the present invention for the dustproof net.

As illustrated in FIG. 4, the engine compartment 2 is provided with a battery installation region 2d in which the batteries 10 are arranged, and also with a heat-exchanger mounting region 2e in which the plural heat exchangers, specifically the oil cooler 6, radiator 7, intercooler 8 and condenser 9 are arranged. An object to be arranged by the installation structure of this embodiment, specifically a dustproof net 11 for removing dust contained in air drawn in by the cooling fan 5 is arranged, for example, at a boundary between the battery installation region 2d and the heat-exchanger mounting region 2e. For example, the dustproof net 11 is singly arranged at a position on a side upstream of the condenser 9 located most upstream among the heat exchangers and in isolation from the condenser 9 such that it is commonly used for the oil cooler 6, radiator 7, intercooler 8 and condenser 9. As depicted in FIG. 3, this dustproof net 11 is composed of a net section 11a having meshes defined therein and a frame section 11b formed to hold the net section 11a and to surround the top, bottom, left and right parts of the net section 11a. The frame section 11b is provided with clips 11c.

The installation structure according to the present invention for the dustproof net 11 is provided with a support structure for supporting the dustproof net 11 on members that form the compartment on the revolving upperstructure 1, specifically the engine compartment 2. This support structure comprises holding strips, which hold the dustproof net 11 thereon and are to be fixedly secured on the members that form the engine compartment 2.

These holding strips comprise, for example, a first side-holding strip 12 to be fixedly secured on a front-side compartment cover 2a located, as a member forming the engine compartment 2, on a front side of the revolving upperstructure 1 to hold one of opposite sides of the dustproof net 11, a second side-holding strip 13 to be fixedly secured on a rear-side compartment cover 2b located, as another member forming the engine compartment 2, on a rear side of the revolving upperstructure 1 to hold the other side of the dustproof net 11, a bottom-holding strip 14 to be fixedly secured on a revolving frame 1a of the revolving upperstructure 1, said revolving frame 1a being a further member forming the engine compartment 2, to hold a bottom of the dustproof net 11, and a top-holding strip 15 arranged on a top part of the dustproof net 11 and fixedly secured at one end thereof on the first side-holding strip 12 and at an opposite end thereof on the second side-holding strip 13.

The second side-holding strip 13 has receiving slots 13a into which unillustrated tabs formed on the other side of the dustproof net 11 are inserted, the first side-holding strip 12 has unillustrated slots into which the clips 11c formed on the one side, specifically the frame section 11b of the dustproof net 11 are inserted, and the bottom-holding strip 14 has holding lugs 14a for supporting the bottom of the dustproof net 11.

The top, bottom, left and right parts of the dustproof net 11 are shielded, for example, by the top-holding strip 15, bottom-holding strip 14, first side-holding strip 12 and second side-holding strip 13. It is to be noted that as shown in FIG. 2, upper portions of the engine 4, cooling fan 5 and heat exchangers such as the radiator 7 and condenser 9 are covered by an upper compartment cover 2c as a still further member forming the engine compartment 2. In addition, an openable/closable door cover 3 is arranged on a side wall of the engine compartment 2 at a position opposite the dustproof net 11.

In this embodiment in which as mentioned above, the dustproof net 11 is arranged at the position on the side upstream of the condenser 9 located most upstream among all the heat exchangers and in isolation from the condenser 9, the dust contained in the air drawn in by the cooling fan 5 as illustrated in FIGS. 1 and 2 is removed by the dustproof net 11. The clean air from which the dust has been removed as described above is fed to the heat exchangers, specifically the condenser 9, oil cooler 6, radiator 7 and intercooler 8, and further, is applied as cooling air to the engine 4. As a consequence, the engine 4 is cooled.

When a great deal of dust has deposited on the dustproof net 11 and the dustproof net 11 hence needs a maintenance, the door cover 3 illustrated in FIG. 2 is opened, and the dustproof net 11 is detached from the first side-holding strip 12, second side-holding strip 13 and bottom-holding strip 14 and is then taken out of the engine compartment 2. Upon accommodating and installing the dustproof net 11 back in the engine compartment 2 after the maintenance, the unillustrated tabs formed on the other side of the dustproof net 11 are inserted into the receiving slots 13a of the second side-holding strip 13, and with the dustproof net 11 being supported in this state, the clips 11c formed on the frame section 11 of the dustproof net 11 are inserted into the unillustrated slots of the first side-holding strip 12 to hold the one side of the dustproof net 11 in place by the clips 11c. In addition, the dustproof net 11 is arranged such that it is supported at the bottom thereof by the holding lugs 14a of the bottom-holding strip 14. After the installation of the dustproof net 11, the door cover 3 is closed.

According to the installation structure of this embodiment constructed as described above, the dustproof net 11 for removing dust contained in air drawn in by the cooling fan 5 is supported on the members that form the engine compartment 2 in which the engine 4, cooling fan 5 and plural heat exchangers such as the radiator 7 and condenser 9 are accommodated, specifically on the front-side compartment cover 2a, rear-side compartment cover 2b and revolving frame 1a by the support members, specifically the first side-holding strip 12, second side-holding strip 13, bottom-holding strip 14 and top-holding strip 15. Therefore, the dustproof net 11 can be arranged independently of the plural heat exchangers such as the radiator 7 and condenser 9. In other words, the dustproof net 11 can be installed without being affected by the mounting positions of the plural heat exchangers such as the radiator 7 and condenser 9. As a consequence, the dustproof net 11 can be installed at a position where its attachment and detachment work is facilitated, thereby making it possible to improve the efficiency of a maintenance of the dustproof net 11.

According to this embodiment, the shape and dimensions of the dustproof net 11 can be set irrelevant to the plural heat exchangers such as the radiator 7 and condenser 9. It is, therefore, possible to make sufficiently large the shape and dimensions of the dustproof net 11 as needed. When the dustproof net 11 is enlarged as described above, it is possible to realize providing the dustproof net 11 with a longer service life. As the shape and dimensions of the dustproof net 11 can be set irrelevant to the plural heat exchangers such as the radiator 7 and condenser 9, dustproof nets 11 of the same shape and dimensions can be arranged in respective hydraulic excavators which are the same in the shape and dimensions of the engine room 2 but are different from each other in the shapes and dimensions of plural heat exchangers such as the radiator 7 and condenser 9 to be accommodated in the engine compartment 2, and the dustproof net 11 is assured to have excellent versatility. Therefore, the manufacture of the dustproof nets 11 in such a case can be facilitated, and their manufacturing cost can be lowered.

The support members that support the dustproof net 11 thereon include holding strips, which are composed, for example, of the first side-holding strip 12, second side-holding strip 13, bottom-holding strip 14 and top-holding strip 15. The dustproof net 11 can, therefore, be held by these first side-holding strip 12, second side-holding strip 13, bottom-holding strip 14 and top-holding strip 15. In this embodiment, the dustproof net 11 can be stably held by the cooperation of the first side-holding strip 12, second side-holding strip 13 and bottom-holding strip 14. Further, it is possible to shield the left, right, bottom and top parts of the dustproof net 11 by the first side-holding strip 12, second side-holding strip 13, bottom-holding strip 14 and top-holding strip 15 and hence, to surely guide cooling air, which is produced by the cooling fan 5, to the dustproof net 11 such that the cooling air is allowed to pass through the dustproof net 11. High dustproof performance can be assured accordingly.

The dustproof net 11 is arranged such that it is commonly used for all the heat exchangers of the oil cooler 6, radiator 7, intercooler 8 and condenser 9, and therefore, the number of dustproof nets to be installed can be reduced. As a consequence, the manufacturing cost of dustproof nets can be lowered. It is also possible to facilitate the detachment and attachment work of the dustproof net 11 upon performing a maintenance. Further, the dustproof net 11 is arranged at the boundary between the battery installation region 2d and the heat-exchanger mounting region 2e. Therefore, the battery installation region 2d located upstream of the dustproof net 11 can be used as a space for straightening air that is to pass through the dustproof net 11, thereby making it possible to apply air, which has been drawn into the engine compartment 2, evenly through the entire area of the dustproof net 11. This can also assure high dustproof performance.

In the above-described embodiment, the first side-holding strip 12, second side-holding strip 13, bottom-holding strip 14 and top-forming strip 15 are arranged as the support structure for supporting the dustproof net 11 on the members that form the engine compartment 2. If it is desired to enlarge the shape and dimensions of the dustproof net 11 to maximum extents, however, the support structure may be constructed instead of the above-mentioned construction, for example, by a member arranged directly on the front-side compartment cover 2a of the engine compartment 2 and corresponding to the clips 11c formed on the first side-holding strip 12, another member arranged directly on the rear-side compartment cover 2b of the engine compartment 2 and corresponding to the receiving slots 13a of the second side-holding strip 13, and a further member arranged directly on the revolving frame 1a of the revolving upperstructure 1 and corresponding to the holding lugs 14a formed on the bottom-holding strip 14. This support structure can have various constructions.

If it is desired to increase the area of the net section while retaining the basic construction of the above-described embodiment, it is possible to form, for example, the first side-holding strip 12 or bottom-holding strip 14 of a relatively large area by a dustproof net which is composed, like the dustproof net 11, of a net section and a frame section holding the net section thereon.

In the above-described embodiment, the dustproof net 11 is singly arranged such that it is commonly used for all the heat exchangers of the oil cooler 6, radiator 7, intercooler 8 and condenser 9. While retaining such construction, however, the radiator 7 or the like may be provided with its own dustproof net. When constructed so, the meshes of the net section of the dustproof net 11 may be set relatively coarse, and the meshes of the net section of the dustproof net to be arranged for the radiator 7 or the like may be set finer compared with the meshes of the net section of the dustproof net 11.

The above-described embodiment is constructed with the single dustproof net 11 installed on the side upstream of the condenser 9. In plural stages, for example, two stages, dustproof nets similar to the dustproof net 11 may, however, be arranged on a side upstream of the condenser 9 such that the dustproof nets are located in an upstream-to-downstream relationship along the flow of air drawn in by the cooling fan 5, and these dustproof nets may each be supported by a support structure on the members that form the engine compartment 2. In this case, the meshes of the net section of the dustproof net installed on the upstream side may be set relatively coarse, and the meshes of the net section of the dustproof net installed on the downstream side may be set finer than those of the net section of the upstream-side dustproof net. Further, the dustproof net 11 may be divided into plural parts in a direction perpendicular to the flow of air drawn in by the cooling fan 5 such that divided plural dustproof nets are formed. The divided plural dustproof nets may then be arranged side by side without leaving spaces therebetween. The thus-arranged, divided plural dustproof nets may then be supported by support structures on the members that form the engine compartment.

The invention claimed is:

1. An installation structure for a dustproof net to be arranged in a machine having an engine, a cooling fan for producing cooling air to cool the engine, plural heat exchangers arranged on an upstream side of the cooling fan, and a compartment with the engine, cooling fan and plural heat exchangers accommodated therein such that the dustproof net is arranged at a position on a side upstream of the heat exchanger located most upstream among the plural heat exchangers relative to a flow of air drawn in by the cooling fan and in isolation from the most upstream heat exchanger to remove dust contained in the air drawn in by the cooling fan, wherein:

the dustproof net is provided with a support structure for supporting the dustproof net on members that form the compartment, the machine is a construction machine provided with a revolving upperstructure, the compartment is an engine compartment mounted on the revolving upperstructure, the support structure comprises holding strips, which hold the dustproof net thereon and is to be fixedly secured on the members that form the engine compartment, wherein the holding strips comprise:

a first side-holding strip to be fixedly secured on a front-side compartment cover located, as a member forming the engine compartment, on a front side of the revolving upperstructure to hold one of opposite sides of the dustproof net, a second side-holding strip to be fixedly secured on a rear-side compartment cover located, as another member forming the engine compartment, on a rear side of the revolving upperstructure to hold the other side of the dustproof net, a bottom-holding strip to be fixedly secured on a revolving frame of the revolving upperstructure, said revolving frame being a further member forming the engine compartment, to hold a bottom of the dustproof net, and a top-holding strip arranged on a top part of the dustproof net and fixedly secured at one end thereof on the first side-holding strip and at an opposite end thereof on the second side-holding strip.

2. An installation structure for a dustproof net to be arranged in a machine having an engine, a cooling fan for producing cooling air to cool the engine, a plurality of heat exchangers arranged on an upstream side of the cooling fan, and a compartment with the engine, cooling fan and plural heat exchangers accommodated therein such that the dustproof net is arranged at a position on a side upstream of the heat exchanger located most upstream among the plurality of heat exchangers relative to a flow of air drawn in by the cooling fan and in isolation from the most upstream heat exchanger to remove dust contained in the air drawn in by the cooling fan, wherein:

the dustproof net is provided with a support structure for supporting the dustproof net on members that form the compartment, the machine is a construction machine provided with a revolving upperstructure, the compartment is an engine compartment mounted on the revolving upperstructure, the support structure comprises holding strips, which hold the dustproof net thereon and is to be fixedly secured on the members that form the engine compartment, wherein the holding strips comprise:

a first side-holding strip to be fixedly secured on a front-side compartment cover located, as a member forming the engine compartment, on a front side of the revolving upperstructure to hold one of opposite sides of the dustproof net, a second side-holding strip to be fixedly secured on a rear-side compartment cover located, as another member forming the engine compartment, on a rear side of the revolving upperstructure to hold the other side of the dustproof net, a bottom-holding strip to be fixedly secured on a revolving frame of the revolving upperstructure, said revolving frame being a further member forming the engine compartment, to hold a bottom of the dustproof net, and a top-holding strip arranged on a top part of the dustproof net and fixedly secured at one end thereof on the first side-holding strip and at an opposite end thereof on the second side-holding strip, wherein the dustproof net is arranged such that the dustproof net is commonly used for all the plural heat exchangers, and wherein the engine compartment comprises a battery installation region arranged on a draw-in side relative to the flow of air drawn in by the cooling fan and accommodating batteries arranged therein and a heat-exchanger mounting region arranged on a downstream side of the battery installation region and accommodating the plural heat exchangers arranged therein, and the dustproof net is arranged at a boundary between the battery installation region and the heat-exchanger mounting region.

* * * * *